(No Model.)
T. A. MACDONALD.
DEVICE FOR UTILIZING WATER POWER.
No. 507,375. Patented Oct. 24, 1893.
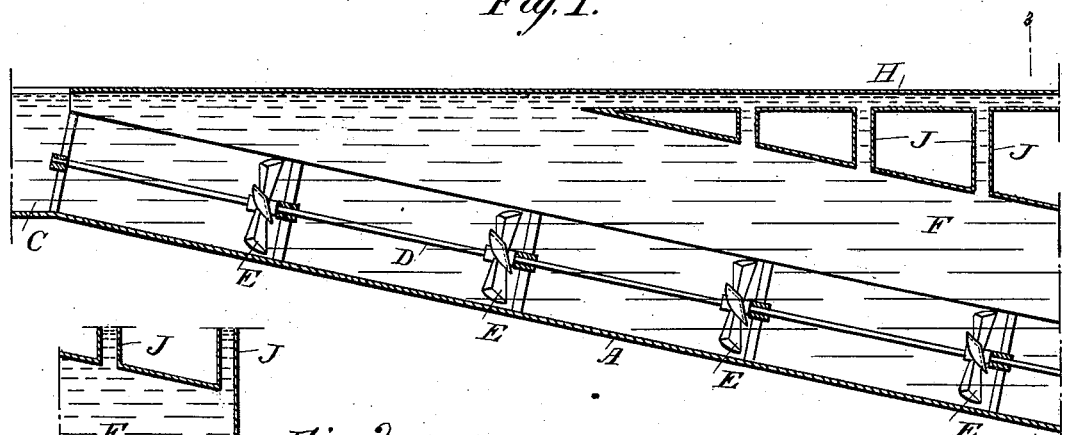
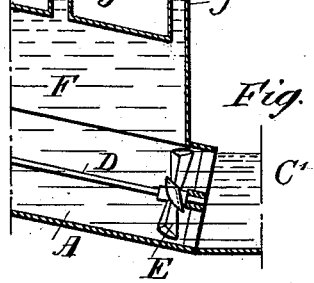
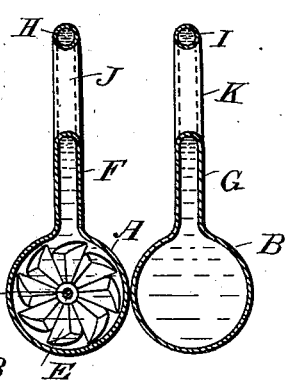
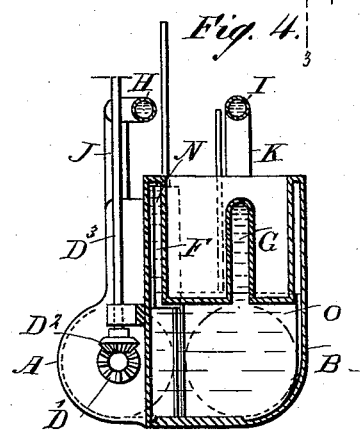
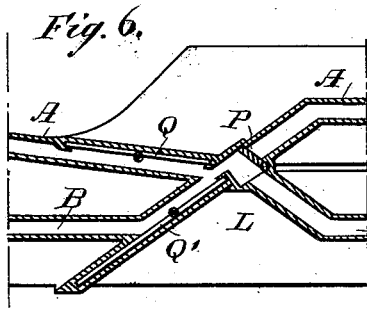
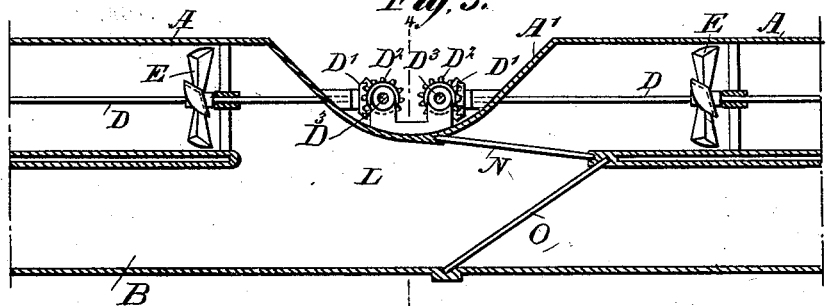
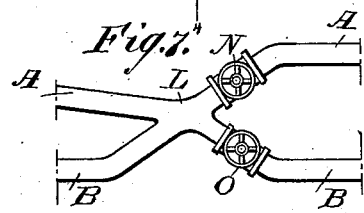
WITNESSES:
Donn Turtchell
E. Sedgwick
INVENTOR
T. A. Macdonald
BY
Munn & Co
ATTORNEYS.

UNITED STATES PATENT OFFICE.

THOMAS ANTHONY MACDONALD, OF PATERSON, NEW JERSEY.

DEVICE FOR UTILIZING WATER-POWER.

SPECIFICATION forming part of Letters Patent No. 507,375, dated October 24, 1893.

Application filed January 28, 1893. Serial No. 460,050. (No model.)

*To all whom it may concern:*

Be it known that I, THOMAS ANTHONY MACDONALD, of Paterson, in the county of Passaic and State of New Jersey, have invented a new and Improved Device for Utilizing Water-Power, of which the following is a full, clear, and exact description.

The object of the invention is to provide a new and improved device for utilizing the water power of streams, rivers, &c., in a very economical manner, and without losing any of the pressure.

The invention consists principally in an inclined race-way containing the water motors, the top of the said race-way being formed with a longitudinal slot opening into a vertically disposed box also connected with the intake for the race-way.

The invention also consists of certain parts and details and combinations of the same, as will be hereinafter described and then pointed out in the claims.

Reference is to be had to the accompanying drawings forming a part of this specification, in which similar letters of reference indicate corresponding parts in all the figures.

Figure 1 is a sectional side elevation of the improvement. Fig. 2 is a like view of the lower end of the same. Fig. 3 is a transverse section of the same on the line 3—3 of Fig. 1. Fig. 4 is a like view of the improvement at the shifting gates, on the line 4—4 of Fig. 5. Fig. 5 is a sectional plan view of the same. Fig. 6 is a reduced sectional plan view of a modified form of the improvement; and Fig. 7 is a plan view of another modified form of the improvement.

The improved device for utilizing the water power of rivers, streams, &c., is provided with a main race-way A, alongside of which is arranged an auxiliary race-way B, both preferably made circular in cross section and inclined, so that the upper ends connect with the intake C, while the lower ends open in a discharge channel C', as plainly indicated in Fig. 2. In the main race-way A are journaled one or more shafts D carrying water wheels E, or other suitable water motors of any improved construction.

In the top of the race-ways A and B are formed slots connecting with longitudinally extending boxes F and G inclined like the race-ways and connected at their upper ends with the intake, as will be readily understood by reference to Fig. 1, so that the water of the intake flows into the race-ways A and B, and likewise in the boxes F and G, so that an equal pressure is maintained on the water in the race-ways by the sheet of water in the respective boxes F and G. The lower ends of the boxes F and G are closed at the lower ends of the race-ways A and B, so that the water in the race-ways is held under the pressure of the intake or head of water throughout its length. From the intake C also extend horizontally the pipes H and I over the race-ways A and B, and their corresponding boxes F and G, and from the said pipe H leads at suitable intervals, a vertically disposed and downwardly extending branch J or K, connecting with the top of the box F or G, respectively.

It will be seen that the water from the intake will fill the pipes H and I, and the corresponding branch pipes J and K, so that the water contained in the boxes F and G, is subjected to an additional pressure, so that throughout the length of the race-ways A and B, the water has a uniform pressure, and each water motor E is actuated with the full force of the head of the water.

As illustrated in Figs. 4 and 5 two shafts are arranged in the race-way A and the adjacent ends of the two shafts project through the inwardly bent wall A' to the outside, the outer end of each shaft being provided with a bevel gear wheel D', in mesh with a bevel gear wheel $D^2$, secured on the lower end of a vertically disposed shaft $D^3$, connected with suitable machinery to be driven. At this point in the race-way A, is arranged a shifting device L, so that either of the two shafts can be rotated without rotating the other, in case of damage or break-down of the machinery connected with the respective shaft to be stopped temporarily.

Now, as shown in Fig. 5, two gates N and O are employed which extend across the race-ways A and B and which serve to pass the water to the lower part of the race-way A or only through the lower part of the race-way B. For instance, when it is desired to stop the upper shaft D, the gate O is closed, and the gate N is opened, so that the water from the auxiliary race-way B passes over into the upper end of the lower part of the race-way A, to actuate the water wheels E therein. When it is desired to close the lower part of the race-way A and the water motors therein, then the gate N is closed and the gate O is opened, so that the water will pass down the upper part of the race-way A, but not through the lower part of the same.

As illustrated in Fig. 6, a single gate P is employed for accomplishing the same result, the gate P being mounted to swing on vertically disposed pivots across the race-ways A and B, so as to open or close the lower part of the race-way A, for the purpose above mentioned and described relative to the gates N and O. At this gate way arrangement in the race-ways A and B, may also be arranged gates Q and Q' for letting out water whenever deemed necessary.

It will be seen that when the water flows down the race-way A the water motors E therein are rotated, each with the full head of pressure, so that the shaft D is rotated with a power corresponding to the aggregate power of all the motors on the shaft.

Having thus described my invention, what I claim as new, and desire to secure by Letters Patent, is—

1. A device for utilizing water power, comprising a race-way containing the water motors and arranged in an inclined position, and a pressure box set on top of the race-way and opening into the same throughout its length, the said race-way and its pressure box being connected with the intake at their upper ends, substantially as shown and described.

2. A device for utilizing water power, comprising an inclined race-way containing the water motors and connected at its upper end with the intake and at its lower end with a discharge, and a pressure box set on the top of the race-way and opening into the same throughout its length, the lower end of the said pressure box being closed, while the upper end opens into the intake for the race-way, substantially as shown and described.

3. A device for utilizing water power, comprising an inclined race-way containing the water motors and connected at its upper end with the intake and at its lower end with a discharge, a pressure box set on the top of the race-way and opening into the same, the lower end of the said pressure box being closed, while the upper end opens into the intake for the race-way, a horizontally disposed pipe connected with the intake for the race-way, and branch pipes leading from the said horizontal pipe down into the pressure box, substantially as shown and described.

4. A device for utilizing water power, comprising an inclined main race-way, an auxiliary race-way arranged alongside the said main race-way, pressure boxes arranged on top of the said race-ways and in communication with the same, the lower ends of the said pressure boxes being closed, while their upper ends open into the intake for the race-ways, and motors arranged in the said main race-way, substantially as shown and described.

5. A device for utilizing water power, comprising an inclined main race-way, an auxiliary race-way arranged alongside the said main race-way, pressure boxes arranged on top of the said race-ways, and in communication with the same, the lower ends of the said pressure boxes being closed, while the upper ends open into the intake for the race-ways, motors arranged into the said main race-way, and means for discharging the water from one part of the race-way into part of the other race-way, substantially as shown and described.

6. A device for utilizing water power, comprising an inclined main race-way, an auxiliary race-way arranged alongside the said main race-way, pressure boxes arranged on top of the said race-ways and in communication with the same, the lower ends of the said pressure boxes being closed, while the upper ends open into the intake for the race-ways, motors arranged in the said main race-way, horizontal pipes leading from the intake for the race-ways over the latter, and branch pipes extending downwardly from the said horizontal pipes to the pressure boxes for the race-ways, substantially as described.

THOMAS ANTHONY MACDONALD.

Witnesses:
  THEO. G. HOSTER,
  C. SEDGWICK.